(12) United States Patent
Rohr et al.

(10) Patent No.: US 9,476,992 B2
(45) Date of Patent: Oct. 25, 2016

(54) ELECTROMAGNETIC RADIATION DETECTOR WITH GAIN RANGE SELECTION

(75) Inventors: Pierre Rohr, Moirans (FR); Jean-Luc Moro, Le Sappey en Chartreuse (FR)

(73) Assignees: Trixell, Moirans (FR); Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 13/643,932

(22) PCT Filed: Apr. 26, 2011

(86) PCT No.: PCT/EP2011/056590
§ 371 (c)(1),
(2), (4) Date: Oct. 26, 2012

(87) PCT Pub. No.: WO2011/134965
PCT Pub. Date: Nov. 3, 2011

(65) Prior Publication Data
US 2013/0043399 A1  Feb. 21, 2013

(30) Foreign Application Priority Data

Apr. 26, 2010 (FR) ...................... 10 53181

(51) Int. Cl.
*G01T 1/20* (2006.01)
*G01T 1/24* (2006.01)
*H04N 5/355* (2011.01)
*H04N 5/3745* (2011.01)

(52) U.S. Cl.
CPC .............. *G01T 1/243* (2013.01); *G01T 1/24* (2013.01); *G01T 1/247* (2013.01); *H04N 5/35563* (2013.01); *H04N 5/3745* (2013.01)

(58) Field of Classification Search
USPC ............................................. 250/366, 338.1
See application file for complete search history.

(56) References Cited

U.S. PATENT DOCUMENTS 6,759,641 B1 * 7/2004 Loose ............... H01L 27/14609
250/208.1
2006/0274176 A1  12/2006 Guidash
(Continued)

FOREIGN PATENT DOCUMENTS

EP        1998559 A1    12/2008
JP     2006-086425 A     3/2006
(Continued)

OTHER PUBLICATIONS

Office Action in Japanese Patent Application No. 2013-506635, dated Feb. 3, 2015.
Refusing Reason Notice mailed Nov. 24, 2015 in JP Patent Application No. 2013-506635.

*Primary Examiner* — David Porta
*Assistant Examiner* — Edwin Gunberg
(74) *Attorney, Agent, or Firm* — Baker & Hostetler LLP

(57) ABSTRACT

An electromagnetic radiation detector used for imaging comprises a plurality of pixels, each of which converts the electromagnetic radiation to which it is subjected into an electrical signal. Each pixel comprises a plurality of photosensitive elements each converting the radiation received by the photosensitive element into an elementary electrical signal and selection means that select from the elementary electrical signals generated by the photosensitive elements so as to form the electrical output signal of the pixel depending on a gain range chosen for the detector.

15 Claims, 2 Drawing Sheets

(56) References Cited

U.S. PATENT DOCUMENTS

| | | |
|---|---|---|
| 2007/0096033 A1 | 5/2007 | Freund et al. |
| 2008/0007637 A1 | 1/2008 | Cernasov |
| 2008/0179490 A1* | 7/2008 | Ohno .................... G01J 1/4228 250/201.1 |
| 2009/0016625 A1* | 1/2009 | Kim et al. .................... 382/238 |
| 2009/0200451 A1 | 8/2009 | Conners |

FOREIGN PATENT DOCUMENTS

| | | |
|---|---|---|
| JP | 2007-105480 A | 4/2007 |
| JP | 2008-099073 A | 4/2008 |
| JP | 2008-193163 A | 8/2008 |
| JP | 2008-546313 A | 12/2008 |
| WO | 03/100459 A1 | 12/2003 |
| WO | 2009/108182 A1 | 9/2009 |

* cited by examiner

ELECTROMAGNETIC RADIATION DETECTOR WITH GAIN RANGE SELECTION

CROSS-REFERENCE TO RELATED APPLICATIONS

This application is a National Stage of International patent application PCT/EP2011/056590, filed on Apr. 26, 2011, which claims priority to foreign French patent application No. FR 1053181, filed on Apr. 26, 2010, the disclosures of which are incorporated by reference in their entirety.

The invention relates to an electromagnetic radiation detector used for imaging. This type of detector comprises a large number of photosensitive dots called pixels, generally organized in an array or strip. A pixel represents the elementary sensitive element of the detector. Each pixel converts the electromagnetic radiation to which it is subjected into an electrical signal. The electrical signals delivered by the various pixels are collected during a phase for reading the array, then digitized so as to enable processing, and stored so as to form an image. The pixels consist of a photosensitive region that delivers a current of electrical charge depending on the flux of photons that it receives, and an electronic circuit for processing this current. The photosensitive region generally comprises a photosensitive element or photodetector that, for example, may be a photodiode, a photoresistor, or a phototransistor. Large photosensitive arrays are known, which may possess several million pixels.

BACKGROUND

Generally, each pixel consists of a photosensitive element and an electronic circuit comprising, for example, switches, capacitors and resistors, downstream of which an actuator is placed. The assembly formed by the photosensitive element and the electronic circuit allows electrical charge to be generated and collected. The electronic circuit generally allows the charge collected in each pixel to be reset after a charge transfer. The role of the actuator is to transfer the charge collected by the circuit to a read bus. This transfer is carried out when the actuator receives the instruction to do so. The output of the actuator corresponds to the output of the pixel.

Thus, a detector comprises an array of similar pixels, each column (or each row) of adjacent pixels generally being connected to the same read bus.

In this type of detector, a pixel operates in two phases: an image capture phase, during which the electronic circuit of the pixel accumulates electrical charge generated by the photosensitive element, and a read phase, during which the collected charge is transferred to the read bus, by virtue of the actuator.

During the image capture phase, the actuator is passive and the electrical charge collected will change the potential at a connection point between the photosensitive element and the actuator. This connection point is called the charge collection node of the pixel. During the read phase the actuator is active in order to free the charge accumulated in the photosensitive dot, in order to transfer or copy it, or even copy the potential of the charge collection node to a read circuit of the detector.

The expression "passive actuator" is understood to mean that the actuator does not make electrical contact with the read circuit. Thus, when the actuator is passive, the charge collected in the pixel is neither transferred nor copied to the read circuit.

An actuator may be a switch controlled by a clock signal (it is generally a transistor). It may also be a follower circuit or any other device allowing the charge collected in the pixel to be communicated or transferred to the read circuit, for example it may be a capacitive transimpedance amplifier (CTIA).

This type of radiation detector may be used for imaging ionizing radiation, and notably X-rays or γ-rays, in the medical field or in nondestructive testing in the industrial field, or to detect radiological images. The photosensitive elements allow electromagnetic radiation in the visible or near visible range to be detected. These elements are not, or not very, sensitive to the radiation incident on the detector. Thus, a radiation converter called a scintillator is used to convert the incident radiation, for example an X-ray, into radiation in a wavelength range to which the photosensitive elements present in the pixels are sensitive.

During the image capture phase, the electromagnetic radiation, in the form of photons received by each photosensitive element, is converted into electrical charge (electron/hole pairs), and each pixel generally comprises a capacitor allowing this charge to be accumulated so as to change the voltage of the collection node of the pixel. This capacitor may be intrinsic to the photosensitive element, a parasitic capacitor then being spoken of, or added in the form of a capacitor connected in parallel to the photosensitive element.

Thus, according to the prior art, each pixel comprises one photosensitive region, comprising a single photosensitive element.

Current photosensitive elements cannot be directly adjusted to match variations in the flux of radiation. In the human eye, this adjustment is carried out by the iris, which tends to reduce the incident luminous flux under strong illumination. Likewise in a camera this function is achieved by way of a shutter. In a radiation detector, such as described above, this adjustment is much more difficult to achieve.

It has been sought to match variations in flux by adding a capacitor to each pixel, which capacitor may, if required, be connected in parallel to the photosensitive element. More precisely, in the case of low luminosity, the additional capacitors are disconnected in all the pixels of the detector. In the case where the detector is strongly illuminated, the capacitors of all the pixels are connected in order to reduce the voltage of the pixel. In other words, this capacitor allows the gain of the pixel to be modified via its transfer function between the number of photons received and the voltage of the pixel. The additional capacitor is connected by means of an electronic switch, such as, for example, a metal oxide semiconductor (MOS) transistor.

This solution, enabling use of the pixel in different gain ranges, has a number of drawbacks. Firstly the switch enabling connection of the additional capacitor interferes with the voltage of the node of the pixel, because it generates a leakage current. This current degrades the performance of the pixel, notably when the capacitor must be disconnected. Secondly, some of the area of the pixel is occupied by the additional capacitor, to the detriment of the area of the photosensitive element.

SUMMARY OF THE INVENTION

The invention aims to remedy all or some of the aforementioned problems by providing a radiation detector in which the gain range may be selected in each pixel, without an additional capacitor being used to make this selection.

For this purpose, the subject of the invention is a detector for detecting electromagnetic radiation, comprising a plurality of pixels organized in an array of rows and columns, each column, or each row, of pixels being connected to the same read bus of the array, a pixel representing the elementary sensitive element of the detector, each pixel converting the electromagnetic radiation to which it is subjected into an electrical signal, distinguished by the fact that each pixel comprises:

a plurality of photosensitive elements, each photosensitive element converting the electromagnetic radiation that it receives into an elementary electrical signal; and means for selecting from the elementary electrical signals generated by the photosensitive elements of a pixel so as to form the electrical output signal of the pixel depending on the gain range chosen for the detector.

Each pixel comprises a photosensitive region in which a plurality of photosensitive elements is placed.

The gain range is selected externally to the pixel. The gain range may be chosen manually by an operator. The choice of the gain range may also be automated, for example, by placing a photodetector, such as a photoelectric cell for example, near the detector, the photodetector delivering information on the average illumination received by the detector. The choice of the range is then made by comparing this average illumination with preset thresholds.

In the case of low illumination, the gain of the pixel must be as high as possible, and then all, or at least the most sensitive, of the photosensitive elements of the pixel are used to form the electrical output signal of the pixel. Because the photosensitive elements have a larger footprint the maximum gain of the pixel may be increased. In other words, for a given pixel area, the sensitivity of the detector is increased under low illumination.

The invention may be employed in a monochromatic detector in which all the pixels are monochromatic and identical. All the pixels detect the same radiation. The invention may also be employed in a color detector in which groups of monochromatic pixels are placed. In a given group, each pixel is intended to detect the radiation in a given wavelength range. A group may for example contain three elementary pixels, one of which detects red light, another of which detects green light and the third of which detects blue light. The invention may be used in each of the elementary pixels.

BRIEF DESCRIPTION OF THE DRAWINGS

The invention will be better understood and other advantages will become apparent on reading the detailed description of an exemplary embodiment, the description being illustrated by the appended drawing, in which.

For the sake of clarity, the same elements have been given the same reference numbers in the various figures.

DETAILED DESCRIPTION

The two embodiments describe pixels comprising two photosensitive elements. Of course, the invention is not limited to pixels comprising two photosensitive elements. A larger number of photosensitive elements may be used in order to increase the number of gain ranges provided by the detector.

A detector according to the invention is formed by many pixels generally organized in an array or strip. These pixels are generally identical.

Figure 1:
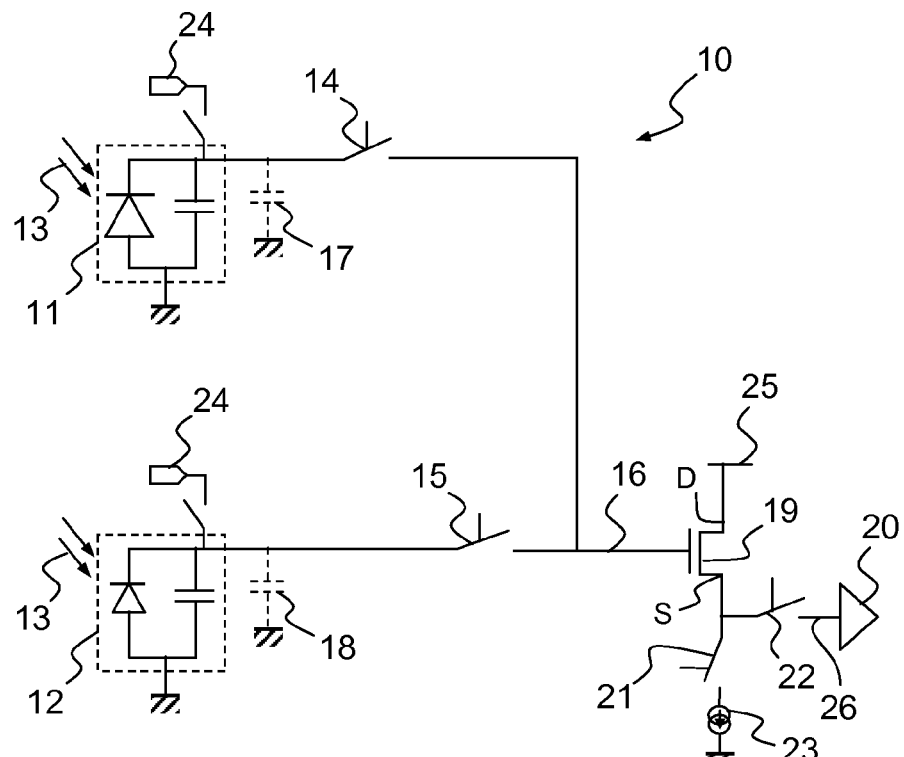
FIG. 1 shows diagrammatically a pixel according to a first embodiment, and able to be used in a detector according to the invention.

FIG. 1 shows a pixel 10 comprising two photodiodes 11 and 12 able to detect radiation 13. The two photodiodes 11 and 12 are shown as a perfect diode and capacitor, the capacitor, here a parasitic capacitor, being connected in parallel with the diode. This representation allows the operation of a photodiode to be understood, the photodiode comprising a parasitic capacitor that is charged during illumination by the radiation 13. Charging of the parasitic capacitor forms an elementary electrical signal that is delivered by each of the photodiodes 11 and 12 to their respective cathodes. The anode of each of the photodiodes 11 and 12 is connected to a ground plane of the detector.

It is of course possible to employ the invention with other families of photosensitive elements, such as photoresistors and phototransistors. The diagram will of course need to be changed for these other families.

In addition, a photosensitive element may be formed from a plurality of photodetectors (photodiodes, photoresistors, phototransistors, etc.) allowing the radiation received to be converted into a single elementary electrical signal.

The pixel 10 comprises means for selecting the elementary electrical signals of one or both photodiodes 11 and 12, so as to form an output electrical signal of the pixel 10 depending on the gain range chosen for the detector. More precisely, the elementary electrical signal, in the form of a voltage, is formed by electrical charge accumulated by the photosensitive element 11 or 12 considered, and the electrical output signal is formed by an average of the voltages from the one or more selected photosensitive elements 11 and 12. In the example shown, the pixel 10 comprises two selection switches 14 and 15 each allowing one of the two photodiodes, 11 and 12, respectively, to be connected to a node 16 of the pixel 10, this node forming a potential point where an output signal of the pixel 10 is formed. More generally, the pixel 10 comprises at least one selection switch allowing at least one of the photosensitive elements to be connected to the node 16, this node being located upstream of an actuator 19 allowing the pixel 10 to be read. In this embodiment, the actuator 19 is an NMOS transistor operating in follower mode.

The transistor operating in follower mode, unlike a simple switch, does not directly connect the collection node 16 to the read circuit but copies, when a clock signal 23 makes a current flow, the value of the voltage on the collection node 16 of the pixel 10 to an output 22, the voltage being shifted by the threshold voltage Vth of the transistor 19. The output 22 is here formed by a switch. This copy makes it possible not to change the charge accumulated on the node 16 while ensuring the output 22 has a low impedance.

In the example shown, the area of the photodiode 11 is larger than that of the photodiode 12. This area difference is represented by the size of the photodiodes 11 and 12 in the figure. In practice, the two photodiodes 11 and 12 could be coupled under low illumination and only the photodiode 12 will be used under high illumination by the radiation 13.

In the case of low illumination, possibly only the photodiode 11 will be used, the switch 15 being turned off during the read phase. Although this variant reduces the useful photosensitive area of the pixel 10, it allows the number of components connected to the node 16 to be reduced and therefore allows leakage current from the node 16 to be decreased. This reduces noise on the output signal of the pixel 10.

As a variant, it is possible to remove the switch 15 and leave the photodiode 12 permanently connected to the node 16, only the switch 14 being closed when it is desired to change the gain range under low illumination. This variant also allows the number of components connected to the node 16 of the pixel 10 to be decreased. Generalizing this variant, each pixel 10 may comprise N photosensitive elements, N being two or more, and N−1 selection switches, one of the photosensitive elements being permanently connected to the read actuator 19.

Advantageously, the photosensitive element 12 that is permanently connected to the read actuator 19 generates a smaller elementary signal than the one or more elementary signals generated by the one or more other photosensitive elements, for example the photosensitive element 11, for a given incident electromagnetic radiation 13.

Adjusting capacitors 17 and 18 may be connected in parallel with the photodiodes, 11 and 12, respectively, so as to increase the capacitance associated with each of the photodiodes 11 and 12. In practice, the capacitor 18 is often necessary in order to reduce the voltage of the elementary signal delivered by the photodiode 12. In contrast, the capacitor 17 is often not necessary due to the larger area of the photodiode 11 and therefore its larger parasitic capacitance. Generally, it is advantageous to do without the additional capacitors, and at least the capacitor 17, so as to limit the number of components in parallel with the photodiodes 11 and 12. This is because these components generate leakage currents that adversely affect the quality of the elementary signals. In addition, they are bulky and reduce the useful area of each pixel, i.e. the detection area of the photosensitive elements. Furthermore, using a small-area photodiode 12 generally means that an adjusting capacitor 18 is not required, which is an additional advantage of the invention. If the detection gain of the photodiode 12 is considered, the small detection area compensates for the addition of an adjusting capacitor.

Whether the additional capacitors 17 and 18 are used or not depends on the photodiodes chosen and the desired voltage level of each elementary signal. Generally, their capacitance is between 20% and 500% of the parasitic capacitance of the photodiode with which they are associated.

It will be noted that even if the capacitors 17 and 18 are required, they have smaller capacitances and are therefore smaller, for example 10 to 20 times smaller, than the capacitors used in the prior art to modify the gain range of the pixel, and notably as regards the small-area photodiode 12. This is because, with a single photosensitive element per pixel, the latter must have a size that enables the highest possible gain. It may therefore generate a large photocurrent, meaning that the capacitor must have a high capacitance, if it is desired to reduce the gain of the pixel so as to change its gain range. In contrast, with the invention the capacitor 18 must simply be suited to the photodiode 12, which covers only part of the area of the pixel and therefore generates only a partial current or photocurrent. The capacitor 18 is therefore smaller than that of the prior art.

The read actuator 19 of the pixel 10 allows the node 16 to be connected to a read circuit 20 of the detector. The actuator 19 is turned off throughout an image capture phase during which the elementary electrical signal of each photodiode 11 and 12 is formed. The actuator 19 is turned on throughout a read phase of the pixel 10 during which the electrical output signal is transferred from the node 16 to a read circuit 20.

The read actuator 19 is for example a field-effect transistor controlled by means of two switches 21 and 22 connected to its source S. As for the drain D of the transistor 19, it is connected to a voltage source 25. The transistor 19 then operates in a follower mode. The switch 21 allows a current generator 23 to be connected to the source S, and the switch 22 allows the source S to be connected to the read circuit 20.

The read actuator 19, controlled by the switches 21 and 22, makes it possible to address the pixel 10 in order for it to be read. The row is selected by the switch 21, which allows current to flow through the follower transistor 19 during the read phase. The voltage on the node 16 of the pixel 10 is copied, within Vth, to the output switch 22 of the pixel 10, the potential Vth corresponding to the threshold voltage of the transistor 19. The column is selected by the switch 22, which is turned on in order to copy the voltage on the collection node 16 to a column read bus 26 connected, on the one hand, to the output of the output switch 22, and on the other hand, to the read circuit 20. This enables adequate row/column addressing.

The pixel 10 also comprises zeroing means consisting, for example, of an erasing voltage 24 that may be applied to the respective cathodes of the photodiodes 11 and 12 after a read phase of the pixel 10.

Thus, using this first embodiment, it has been shown how one pixel may contain two photosensitive elements, or photodetectors, of different areas. Generally, in such a configuration, the area of the smaller photosensitive element will be 2 to 10 times smaller than that of the larger photosensitive element.

Naturally, in this first embodiment, the invention is not limited to using two photosensitive elements of different areas in a given pixel, instead several photosensitive elements, possibly of different sizes, may be used in a given pixel, these elements being connected to one and the same actuator 19.

Figure 2:
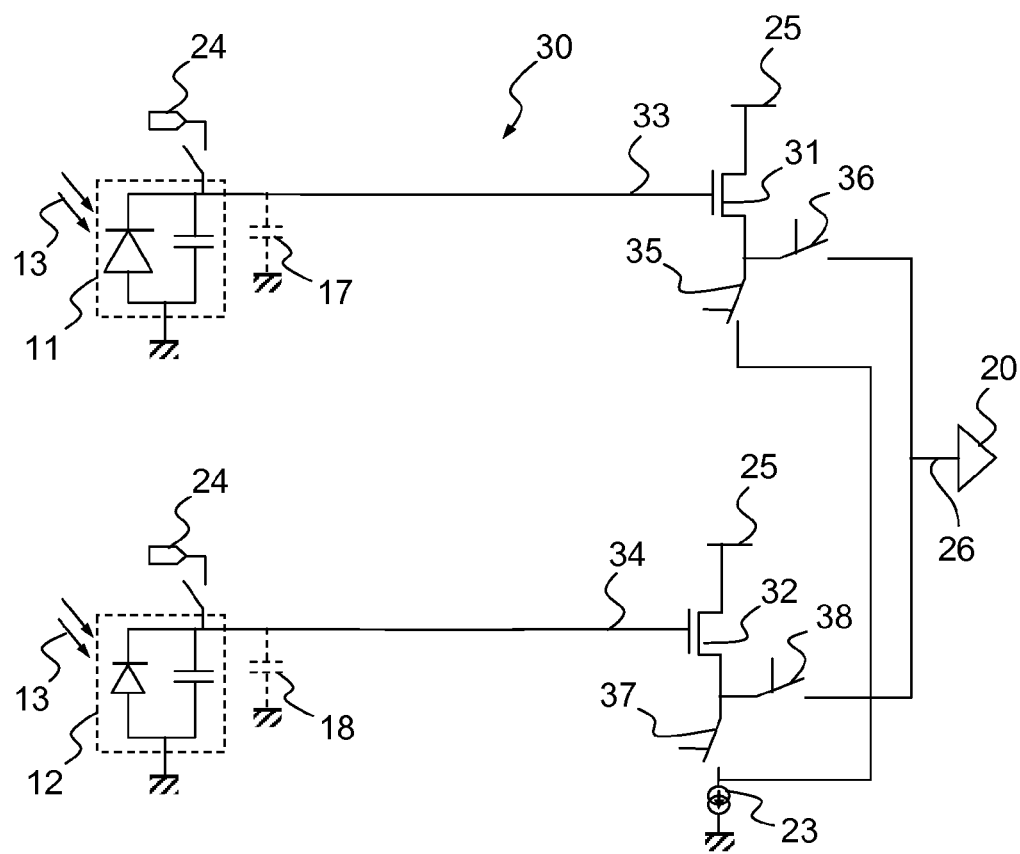
FIG. 2 shows diagrammatically a pixel according to a second embodiment, and able to be used in a detector according to the invention.

FIG. 2 shows a pixel 30 comprising two photodiodes 11 and 12 able to detect radiation 13 and a zeroing means 24. In the pixel 30, in contrast to the pixel 10, there is no node 16 common to the two photodiodes 11 and 12. The pixel 30 comprises, associated with each photodiode 11 and 12, a transistor operating in a follower mode, 31 and 32, respectively. These components 31 and 32 are alternatively used as actuators. It will now be shown how the actuator of the pixel 30 can either be the follower transistor 31 or the follower transistor 32. The read transistors 31 and 32 are turned off throughout an image capture phase during which the elementary electrical signal produced by each of the two photodiodes 11 and 12 is formed. During the read phase, the actuator is either the follower transistor 31 or the follower transistor 32, thereby allowing the photodiode that will form the electrical output signal of the pixel 30 to be selected from the photodiodes 11 and 12.

Elementary nodes 33 and 34, where the charge respectively produced by each photodiode 11 and 12 accumulates, are defined. The nodes 33 and 34 are located upstream of the transistors 31 and 32, relative to the read circuit 20 of the detector. The impedance of the nodes 33 and 34 is much higher than that downstream of the switches 31 and 32. The fact that the switches 14 and 15 described in the preceding embodiment have been removed allows the number of components connected to an elementary node, 33 or 34, to be limited. This allows the leakage current at each node 33 and 34 to be reduced and the quality of the elementary signals obtained from each of the nodes 33 and 34 to be improved.

As for the pixel 10, the transistors 31 and 32 are each controlled by means of two switches—switches 35, 36 for the transistor 31 and switches 37, 38 for the transistor 32. The switches 35 and 37 allow the current generator 23 to be connected, and the switches 36 and 38 allow the voltage on each of the nodes 33 and 34 to be copied to the read circuit 20.

The leakage currents or the parasitic capacitances that they generate have less of an effect on the electrical output signal of the pixel than when the switches are placed upstream of the actuator 19, as in the first embodiment. This is because, in the first embodiment shown in FIG. 1, when the switches are placed upstream of the actuator 19, i.e. in a high-impedance region, they are able to generate parasitic currents, or parasitic capacitances, the latter forming between the terminals of the switches and the control circuit. This changes the charge at the node of the pixel, thereby causing undesirable fluctuations in the output signal of the pixel.

In the second embodiment shown in FIG. 2, the switches 35 to 38 are placed downstream of the switches 31 and 32 allowing the range to be selected, i.e. in a low-impedance region. The switches 35 to 38 therefore have less of an effect on the electrical output signal of the pixel.

The two photodiodes 11 and 12 are preferably different sizes. The elementary signal of the smallest photodiode 12 will possibly be selected for a high illumination. In this case, the actuator of the pixel 30 is the transistor 32. Under low illumination the elementary signal of the larger photodiode 13 will be selected. In this case, the actuator of the pixel 30 is the transistor 31. It is also possible for the photodiodes 11 and 12 to be of comparable size but have different gains. This allows one or other of the two photodiodes 11 and 12 to be chosen depending on the gain desired for the pixel 30. Thus, in this embodiment, the pixel consists of a plurality of photodiodes, each placed upstream of an actuator. For each pixel the actuator and photodiode used are chosen depending on the brightness of the radiation incident on the detector.

As was the case above, the variant in FIG. 2 is not limited to two photodiodes, and the number of photodiodes may be varied as required depending on the desired number of gain ranges. In addition, other families of photosensitive elements may of course be used in the context of this variant. Finally, a photosensitive element may be formed from a plurality of photodetectors associated with one and the same node 33 or 34.

Figure 3:
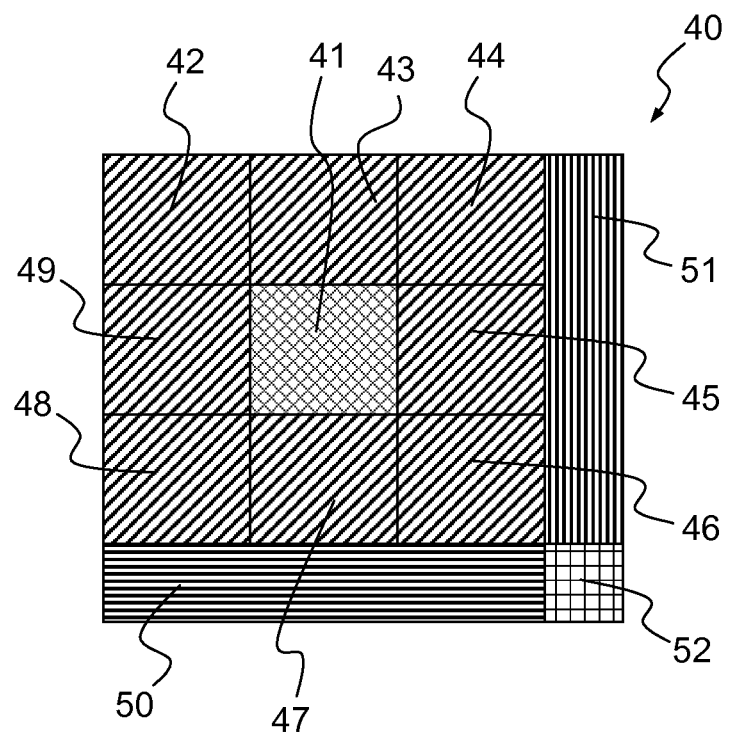
FIG. 3 shows an example of spatial arrangement of a plurality of photosensitive elements inside a pixel.

FIG. 3 shows an example of spatial arrangement of a plurality of photosensitive elements in a pixel 40. This arrangement can be applied to the two variants shown in FIGS. 1 and 2.

The pixel 40 comprises a first photosensitive element 41 that can be used alone under high illumination. The element 41, for example, has a square, or optionally rectangular, shape so as to minimize lost space. The element 41 is, for example, formed from a single photodetector. The element 41 is surrounded by eight other photodetectors 42 to 49 connected so as to deliver together a single elementary signal. The eight photodetectors 42 to 49 advantageously have the same shape as the photodetector forming the photosensitive element 41. The photodetectors 42 to 49 can be used simultaneously under lower illumination. In other words, they are connected to the same transistor, for example 31 in the variant in FIG. 2, or to the same selection switch, for example 14 in the variant in FIG. 1. The photodetectors 41 to 49 may all be identical in order to simplify production of the detector. Two regions 50 and 51 are used to route electrical conductors between the elements 41 to 49 and a region 52 is used to house the various electronic switches and actuator of the pixel 40.

More generally, each pixel 40 comprises a first photosensitive element 41 that can be used for a first gain range, surrounded by a plurality of photodetectors 42 to 49 forming a second photosensitive element that can be used for a second gain range. In the variant in FIG. 2, the first photosensitive element and the photodetectors 42 to 49 are respectively connected to a first potential actuator and to a second potential actuator, the term "potential" being understood to mean that these actuators are both alternative actuators of the pixel 30. Depending on the brightness of the incident radiation, either the first photosensitive element and the first potential actuator will be used, or the photodetectors 42 to 49 and the second potential actuator will be used.

It will be understood that, depending on the embodiment, n groups of photodetectors may be placed in a given pixel, each group of photodetectors comprising at least one photosensitive element, each group of photosensitive elements being connected to a potential actuator, such that, depending on the brightness of the incident radiation, a single group of photodetectors and the potential actuator that it is connected to, are selected.

Figure 4:
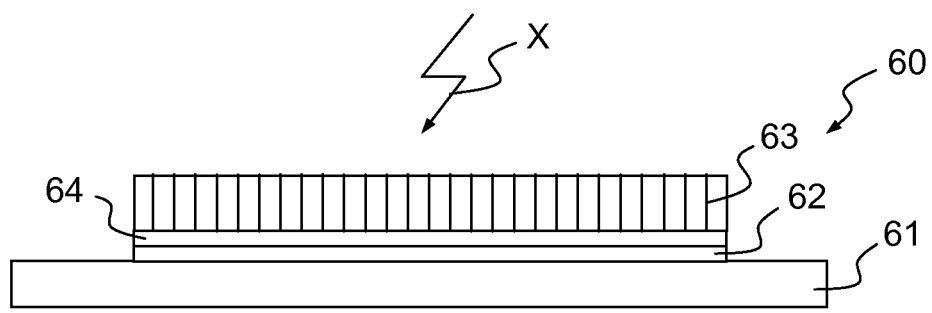
FIG. 4 shows an example of radiation detector that could be used in X-ray radiology.

FIG. 4 shows a radiation detector 60 that can be used for X-ray or gamma-ray radiology. The detector is formed from a substrate 61, for example a silicon substrate, on which the pixels are placed, organized in an array so as to form a photosensitive sensor 62. The sensor 62 is not directly sensitive to radiation at the very short wavelengths of X- or gamma-rays. This is why a radiation converter 63 that comprises a layer of a scintillating substance is associated with the photosensitive sensor 62. This substance has the property, when it is excited by such radiation, of emitting radiation at a longer wavelength, for example light in the visible or near visible range, at which the sensor 62 is sensitive. The light emitted by the radiation converter 63 illuminates the photosensitive elements of the sensor 62, which produce a photoelectric conversion and deliver electrical signals that can be read by read circuits 20. The radiation converter 63, which is commonly called a scintillator 63, may be fastened to the sensor 62 by means of an adhesive film 64 that is able to transmit the radiation emitted by the scintillator 63. An entrance window, not shown, may cover the scintillator 63 so as to protect it from attack from the external environment.

Certain scintillating substances in the alkali-metal-halogenide or rare-earth-oxysulfide families are frequently used for their good performance. Among the alkali-metal halogenides, cesium iodide doped with sodium or thallium, depending on whether an emission at about 400 nanometers or 550 nanometers, respectively, is desired, is known for its high absorption of X-rays and for its excellent scintillation efficiency. It may take the form of thin needles that are grown on a substrate. This family of scintillating substances may emit about several hundred visible photons for each X-ray photon that interacts with the scintillator layer.

Using the invention in a radiation detector such as shown in FIG. 4 allows every X-ray photon to be detected. This is because the gain range is chosen only by reducing the number of visible photons processed by the sensor 62.

The invention claimed is:

1. A detector for detecting electromagnetic radiation, comprising:
a plurality of pixels organized in an array of rows and columns, each column, or each row, of pixels being connected to a same read bus of the array, a pixel representing a first sensitive element of the detector, each pixel converting the electromagnetic radiation to which it is subjected into an electrical signal, each pixel comprising:
a plurality of photosensitive elements, each photosensitive element converting the electromagnetic radiation received by the photosensitive element into a first electrical signal; and
a plurality of read actuators, each read actuator is associated with one of the plurality of photosensitive elements, each read actuator is configured to select from the first electrical signals generated by the photosensitive elements of the pixel so that the selected first electrical signal flows through the read actuator associated with the photosensitive element to form a second electrical signal of the pixel depending on a gain range chosen for the detector, wherein each read actuator is coupled to and controllable by a pair of gain range selection switches placed downstream of said each read actuator for selecting said gain range, said each read actuator operating in a follower mode.

2. The detector as claimed in claim 1, wherein the first electrical signal is formed from electrical charge accumulated by the photosensitive element in the form of a voltage and in that the second electrical signal is formed by an average of the voltages from the one or more selected photosensitive elements.

3. The detector as claimed in claim 1, wherein each read actuator is turned off throughout image capture phases, during which the first electrical signal of each one of the plurality of photosensitive elements is formed, and turned on throughout pixel read phases, during which the second electrical signal is transferred to a read circuit of the detector, and the first electrical signal is selected by at least one selection switch allowing at least one of the photosensitive elements, respectively, to be connected to the actuator.

4. The detector as claimed in claim 3, wherein each pixel comprises N photosensitive elements, N being two or more, and N−1 of the at least one selection switch, one of the plurality of photosensitive elements being permanently connected to the read actuator.

5. The detector as claimed in claim 4, wherein the photosensitive element that is permanently connected to the read actuator generates a smaller first signal than one or more first electrical signals generated by the one or more other photosensitive elements for a given electromagnetic radiation.

6. The detector as claimed in claim 1, wherein the read actuator is turned off throughout image capture phases, during which the first electrical signal is formed, and is turned on throughout a phase for reading the pixel, during which the second electrical signal is transferred to a read circuit of the detector, the closure of one read actuator of the pixel allowing selection of one of the photosensitive elements, which said selected photosensitive element outputs the second electrical signal of the pixel.

7. The detector as claimed in claim 1, wherein one photosensitive element is formed from a plurality of photodetectors that convert the electromagnetic radiation received into a single first electrical signal.

8. The detector as claimed in claim 7, wherein each pixel comprises a first photosensitive element for a first gain range, surrounded by a plurality of photodetectors forming a second photosensitive element for a second gain range.

9. The detector as claimed in claim 1, further comprising a scintillator that converts incident electromagnetic radiation to a radiation in a wavelength range to which the photosensitive elements are sensitive.

10. The detector as claimed in claim 1, wherein the pixel is monochromatic.

11. The detector as claimed in claim 1, being formed from a substrate, on which the pixels are placed.

12. The detector as claimed in claim 1, wherein the gain range is made by comparing an average illumination with preset thresholds.

13. The detector of claim 1, wherein each read actuator is a transistor operating in the follower mode.

14. The detector of claim 1, wherein each read actuator is coupled to an elementary node, where charges produced by an associated photosensitive element are accumulated.

15. The detector of claim 1, wherein each read actuator is controlled by a current generator, wherein the current generator is coupled to the read actuator through a transistor.

* * * * *